(12) United States Patent
Nishiura

(10) Patent No.: US 8,988,747 B2
(45) Date of Patent: Mar. 24, 2015

(54) IMAGE PROCESSING APPARATUS WITH IMPROVED COLOR CALCULATIONS

(71) Applicant: KYOCERA Document Solutions Inc.

(72) Inventor: Mitsuko Nishiura, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 14/161,833

(22) Filed: Jan. 23, 2014

(65) Prior Publication Data

US 2014/0211223 A1 Jul. 31, 2014

(30) Foreign Application Priority Data

Jan. 29, 2013 (JP) .................. 2013-014699

(51) Int. Cl.
 G03F 3/08 (2006.01)
 H04N 1/60 (2006.01)

(52) U.S. Cl.
 CPC ........... H04N 1/6008 (2013.01); H04N 1/6058 (2013.01)
 USPC ............. 358/520; 358/518; 358/1.9; 358/2.1; 382/167

(58) Field of Classification Search
 USPC ............. 358/1.9, 2.1, 518–523; 382/162–167
 See application file for complete search history.

(56) References Cited

U.S. PATENT DOCUMENTS 6,290,318 B1 * 9/2001 Yasukawa ........................ 347/16
2007/0291312 A1 * 12/2007 Kaneko et al. ................. 358/2.1

FOREIGN PATENT DOCUMENTS

| JP | 2001-292333 | 10/2001 |
| JP | 2006-237887 | 9/2006 |
| JP | 2006-345094 | 12/2006 |

\* cited by examiner

*Primary Examiner* — Barbara Reinier

(57) ABSTRACT

An image processing apparatus converts first color values in a first color space to second color values in a second color space for an objective color. If the objective color is not within a color reproduction space of an outputting device, the searching unit searches for a set of color values as base color values in the color reproduction space so that the set of color values minimizes a value of the color difference formula for the first color values. As the second color values, the searching unit determines a set of color values in a predetermine neighbor space of the base color values so that the determined set of color values minimizes a difference between property values on a color property of which the allowed color difference is smallest among the allowed color differences at the first color values.

4 Claims, 5 Drawing Sheets

FIG. 2

$$\Delta E'_{00} = \sqrt{\left(\frac{\Delta L'}{S_L}\right)^2 + \left(\frac{\Delta C'}{S_C}\right)^2 + \left(\frac{\Delta H'}{S_H}\right)^2}$$

$$S_L = 1 + \frac{0.015(L'_{av} - L_{paper})^2}{\sqrt{20 + (L'_{av} - L_{paper})^2}}$$

$$\Delta E^*{}_{ab} = \sqrt{\Delta L'^2 + \Delta C'^2 + \Delta H'^2}$$

IMAGE PROCESSING APPARATUS WITH IMPROVED COLOR CALCULATIONS

CROSS-REFERENCE TO RELATED APPLICATIONS

This application relates to and claims priority rights from Japanese Patent Application No. 2013-014699, filed on Jan. 29, 2013, the entire disclosures of which are hereby incorporated by reference herein.

BACKGROUND

1. Field of the Present Disclosure

The present disclosure relates to an image processing apparatus and an image forming apparatus.

2. Description of the Related Art

In general, if there is a difference between a color range of image data and a color space of an outputting device that outputs an image based on the image data, a color value of the image data is converted to a color value within the color space of the outputting device.

An image processing apparatus (here referred as the first image processing apparatus) prepares a discrimination ellipse which has a reference color at the center thereof and passes through control colors that indicate a boundary obtained by a predetermined subjective evaluation in the L*a*b* coordinate system, and derives a color difference between the reference color and a reproduced color using a weight coefficient based on (a) a parameter of the prepared ellipse and (b) a hue difference between the reference color and the reproduced color.

When color tone of an image is changed in accordance with a user operation, another image processing apparatus (here referred as the second image processing apparatus) specifies a color difference of an objective color in the image, and determines available ranges of color property values (brightness, chroma, and hue) based on CIE1994 color difference formula corresponding to the specified color difference.

Further, another image processing apparatus corrects hue of a foreground of an image on the basis of hue of a background of the image.

In the aforementioned first image processing apparatus, it is required to identify the control colors using the subjective evaluation for all available reference colors (i.e. for all available objective colors of color conversion) in a color range or a color reproduction space of image data, and therefore a large number of reference colors results in much working burden for the subjective evaluation, and consequently it is not realistic. Further, it is not realistic due to complicated calculation for preparing the discrimination ellipse.

In the aforementioned second image processing apparatus, a user specifies the color property values (brightness, chroma, and hue), and therefore it does not perform automatic conversion to a proper color of a predetermined outputting device. Further, in this apparatus, a color difference specified by a user may exceed an allowed color difference.

SUMMARY

An image processing apparatus converting first color values in a first color space to a second color values in a second color space for an objective color according to an aspect of the present disclosure, includes a color converting unit and a storage device. The color converting unit calculates the second color values on the basis of the first color values using a color difference formula that evaluates a color difference between two sets of color values in a coordinate system of plural color properties that at least include brightness. The storage device stores allowed color difference data that indicates respective predetermined allowed color differences corresponding to property values of the plural color properties. The second color space is a color space of a predetermined outputting device. The color converting unit includes an inside-outside identifying unit configured to identify whether the objective color is a color within a color reproduction space of the outputting device or not, and a searching unit configured to find the second color values corresponding to the first color values of the objective color using the color difference formula. The searching unit is further configured (a) to search for a set of color values in the second color space so that the set of color values minimizes a value of the color difference formula for the first color values and determine the set of color values as the second color values, if the objective color is a color within the color reproduction space of the outputting device; and to (b1) search for a set of color values as base color values in the color reproduction space so that the set of color values minimizes a value of the color difference formula for the first color values and (b2) as the second color values, determine a set of color values in a predetermine neighbor space of the base color values in the second color space so that the determined set of color values minimizes a difference between property values on a color property of which the allowed color difference is smallest among the allowed color differences at the first color values, if the objective color is not a color within the color reproduction space of the outputting device.

An image forming apparatus according to an aspect of the present disclosure includes the aforementioned image processing apparatus, an image scanning device configured to a document image that includes the objective color, and a printing device as the outputting device.

These and other objects, features and advantages of the present disclosure will become more apparent upon reading of the following detailed description along with the accompanied drawings.

BRIEF DESCRIPTION OF THE DRAWINGS

FIG. 2 shows a color difference formula used in the image processing apparatus shown in FIG. 1;

FIG. 4 shows a commonly used color difference formula; and

DETAILED DESCRIPTION

Hereinafter, an embodiment according to an aspect of the present disclosure will be explained with reference to drawings.

Figure 1:
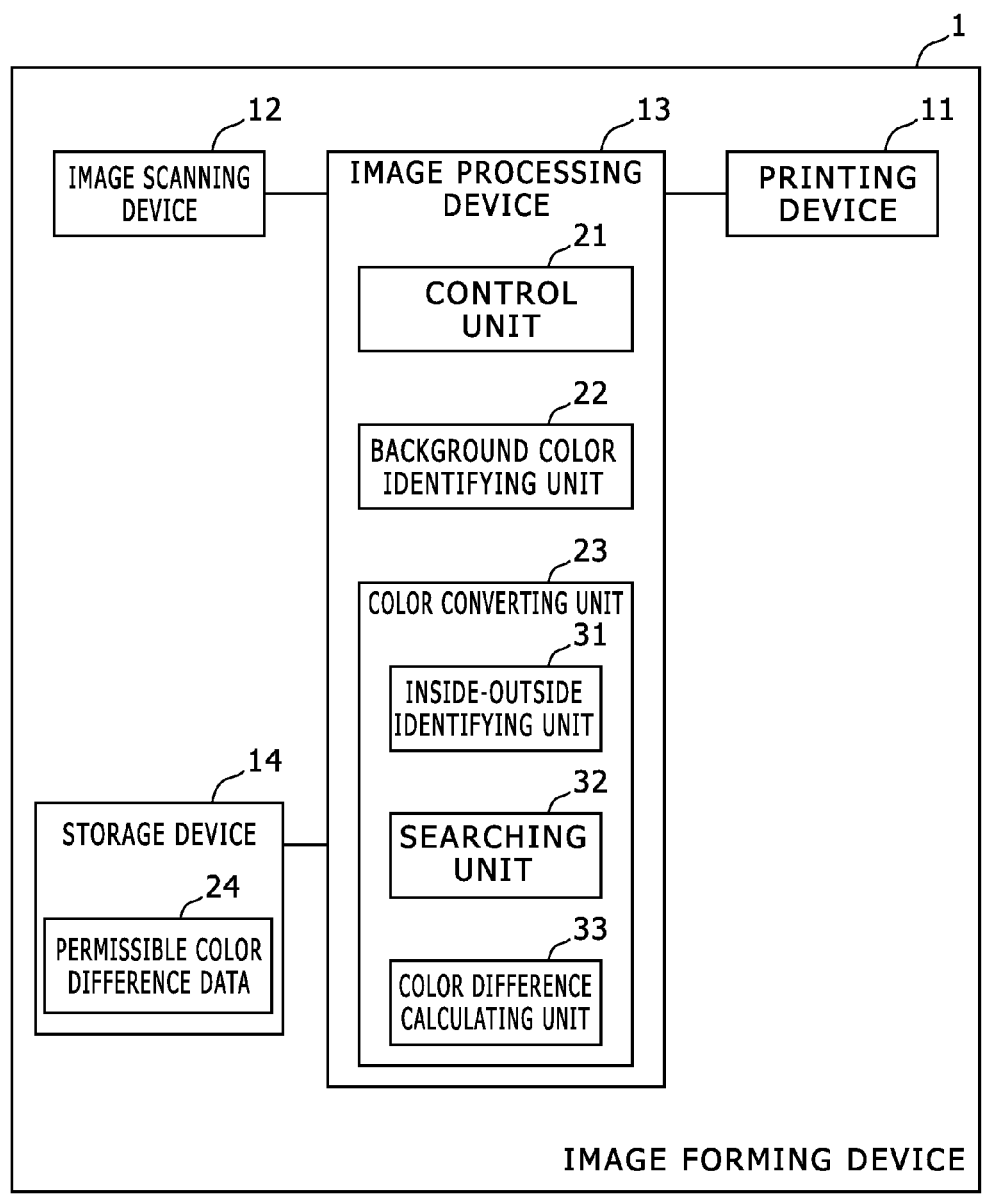
FIG. 1 shows a block diagram which indicates a configuration of an image forming apparatus according to an embodiment of the present disclosure.

FIG. 1 shows a block diagram which indicates a configuration of an image forming apparatus according to an embodiment of the present disclosure. The image forming apparatus 1 shown in FIG. 1 is a copier, but the image forming apparatus 1 may be a multi function peripheral.

The image forming apparatus 1 includes a printing device 11, an image scanning device 12, an image processing apparatus 13, and a storage device 14.

The printing device 11 is an instance of an outputting device and internal device that prints a document image based on image data after color conversion by the image processing apparatus 13 in an electro photographic process using toner of CMYK (Cyan, Magenta, Yellow, and Black) colors.

The image scanning device 12 is an internal device that optically scans a document image of a document and generates image data of the document image as RGB data.

The image processing apparatus 13 performs image processing such as color conversion for image data such as the image data generated by the image scanning device 12.

Further, the storage device 14 is a non volatile rewritable storage device such as a flash memory and stores sorts of data.

The image processing apparatus 13 includes a control unit 21, a background color identifying unit 22, and a color converting unit 23 using an ASIC (Application Specific Integrated Circuit) and/or a micro computer. Further, the storage device 14 stores allowed color difference data 24.

The control unit 21 controls and causes the printing device 11 and the image scanning device 12 to perform acquiring image data of a document and printing a document image.

The background color identifying unit 22 identifies color values of a background color corresponding to an objective color of color conversion performed by the color converting unit 23. Specifically, a color of an object in the image data is used as an objective color, a color of a background of the object (i.e. a color of a paper sheet of the document) is used as a background color, and a color value of the background color (here the brightness Lpaper) is identified.

The color converting unit 23 calculates second color values (here CYMK values) in a color space of the printing device 11 on the basis of first color values (here RGB values) in an original color space of the objective color of the color conversion using a color difference formula that evaluates a color difference between two sets of color values in a coordinate system of plural properties (here brightness, chroma, and hue angle).

The allowed color difference data 24 is data that indicates respective predetermined allowed color differences corresponding to property values of the aforementioned plural properties (brightness, chroma, and hue angle).

The color converting unit 23 includes an inside-outside identifying unit 31, a searching unit 32, and a color difference calculating unit 33.

The inside-outside identifying unit 31 identifies whether the objective color is a color within a color reproduction space of the printing device 11 or not. The inside-outside identifying unit 31 has data that indicates the color reproduction space of the printing device 11 in advance.

The searching unit 32 identifies the second color values corresponding to the first color values of the objective color using a predetermined color difference formula (mentioned below). If the objective color is a color within the color reproduction space of the printing device 11, the searching unit 32 searches for a set of color values in the second color space that minimizes a value of the color difference formula for the first color values and determines the set of color values as the second color values. If the objective color is not a color within the color reproduction space of the printing device 11, the searching unit 32 searches for a set of color values as base color values in the color reproduction space that minimizes a value of the color difference formula for the first color values, and as the second color values, determines a set of color values in a predetermine neighbor space of the base color values in the second color space that minimizes a difference between property values on a color property of which the allowed color difference is smallest among the allowed color differences at the first color values.

In this embodiment, the aforementioned neighbor space is a space in which a color difference value of the color difference formula from the base color values is either equal to or smaller than a predetermined value. For example, as the aforementioned neighbor space, determined is a space of color values of which color differences are either equal to or larger than the value of the color difference formula for the base color values and are either equal to or less than (the value of the color difference formula for the base color values +0.5).

The color difference calculating unit 33 calculates a value of the aforementioned color difference formula.

FIG. 2 shows a color difference formula used in the image processing apparatus shown in FIG. 1. This color difference formula is derived by improving the CIEDE2000 color difference formula on the basis of subjective evaluation.

The subjective evaluation was performed using a fluorescent lamp for color evaluation as a light source in a dark room. A PPC (Plain Paper Copier) paper sheet (ISO Brightness 84 percent) was used as a background. A color chip has a size of 20 millimeters in width and height, and plural color chips are formed of different values with a constant interval in one of brightness, chroma, and hue angle. The plural color chips were horizontally arranged and shown with an interval of 5 millimeters. Using these color chips, a range (i.e. limit values) of a color that a person allows as a reference color (i.e. a color allowed as a reference color outputted by an outputting device) is evaluated. This evaluation is performed by plural persons and each person performs it plural times.

In this color difference formula, delta L' is a brightness difference between color values in the first color space and color values in the second color space, delta C' is a chroma difference between color values in the first color space and color values in the second color space, and delta H' is a hue angle difference between color values in the first color space and color values in the second color space.

Further, L'av is a brightness average value of color values in the first color space and color values in the second color space; and C'av is a chroma average value of color values in the first color space and color values in the second color space.

Further, Lpaper is a brightness of the background color identified by the background color identifying unit 22.

Thus, the color difference formula used in this embodiment is a formula that, using the color value of the background color as a parameter, derives the color difference on the basis of a chroma difference, a brightness difference, and a hue angle difference between color values in the first color space and color values in the second color space. Specifically, this color difference formula is a formula that derives the color difference using the product of the brightness difference and a coefficient based on a brightness value of the background color.

Figure 3A:
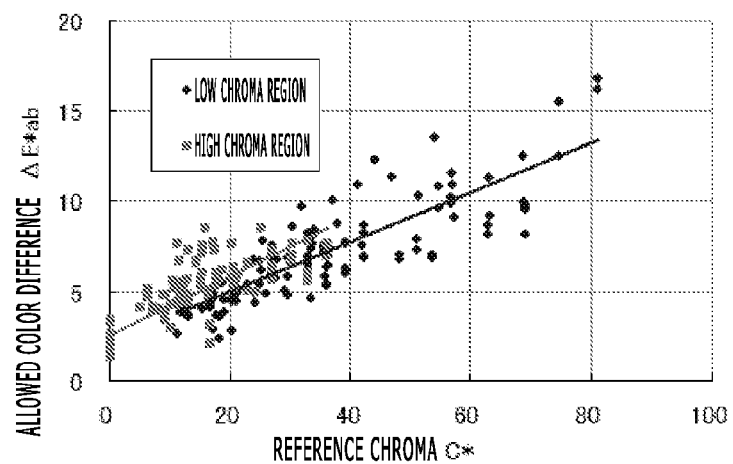
FIGS. 3A to 3C show diagrams that explain allowed color difference data used in the image processing apparatus shown in FIG. 1.
Figure 3B:
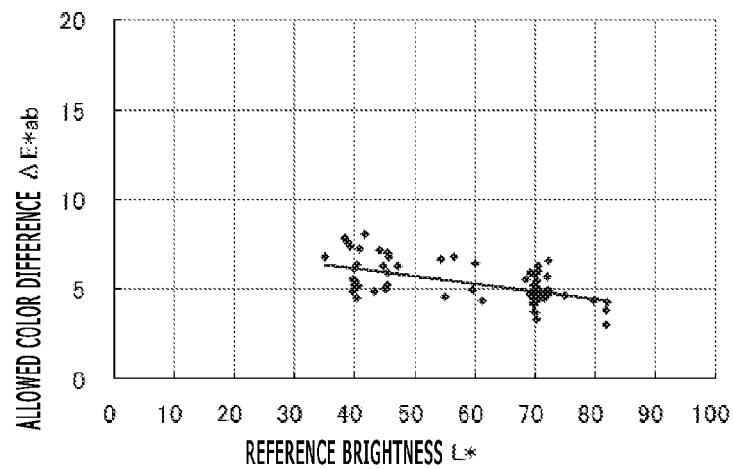
Figure 3C:
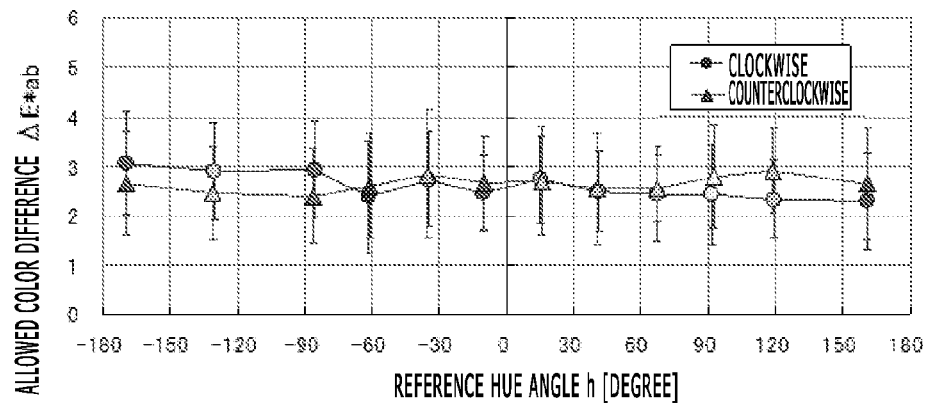

FIGS. 3A to 3C show diagrams that explain allowed color difference data used in the image processing apparatus shown in FIG. 1. FIG. 3A shows a diagram that explains allowed color difference data of chroma. FIG. 3B shows a diagram that explains allowed color difference data of brightness. FIG. 3C shows a diagram that explains allowed color difference data of hue angle.

The allowed color difference data 24 is data that indicates respective predetermined allowed color differences corresponding to property values of the plural color properties.

Figure 4:
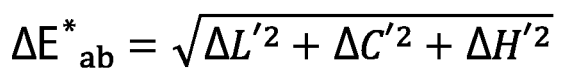

The allowed color difference data 24 is obtained from the aforementioned subjective evaluation as shown in FIGS. 3A to 3C, and in the subjective evaluation, limit values of the allowed color difference are identified for each value of each property among chroma, brightness, and hue angle on the basis of the color difference formula shown in FIG. 4.

Further, for chroma and brightness, approximate formulas (i.e. formulas of values of allowed color differences for values of chroma and brightness) obtained with the least square method or the like are included in the allowed color difference data 24, and using these approximate formulas, values of allowed color differences are obtained for values of chroma and brightness of the objective color.

Further, for hue angle, an average value of allowed color differences at each value of hue angle is included in the allowed color difference data 24, and a value of an allowed color difference is obtained for a value of hue angle of the objective color using interpolation or the like.

It should be noted that the color difference formula shown in FIG. 4 is used for the subjective evaluation, and is not used by the color converting unit 23.

Figure 5:
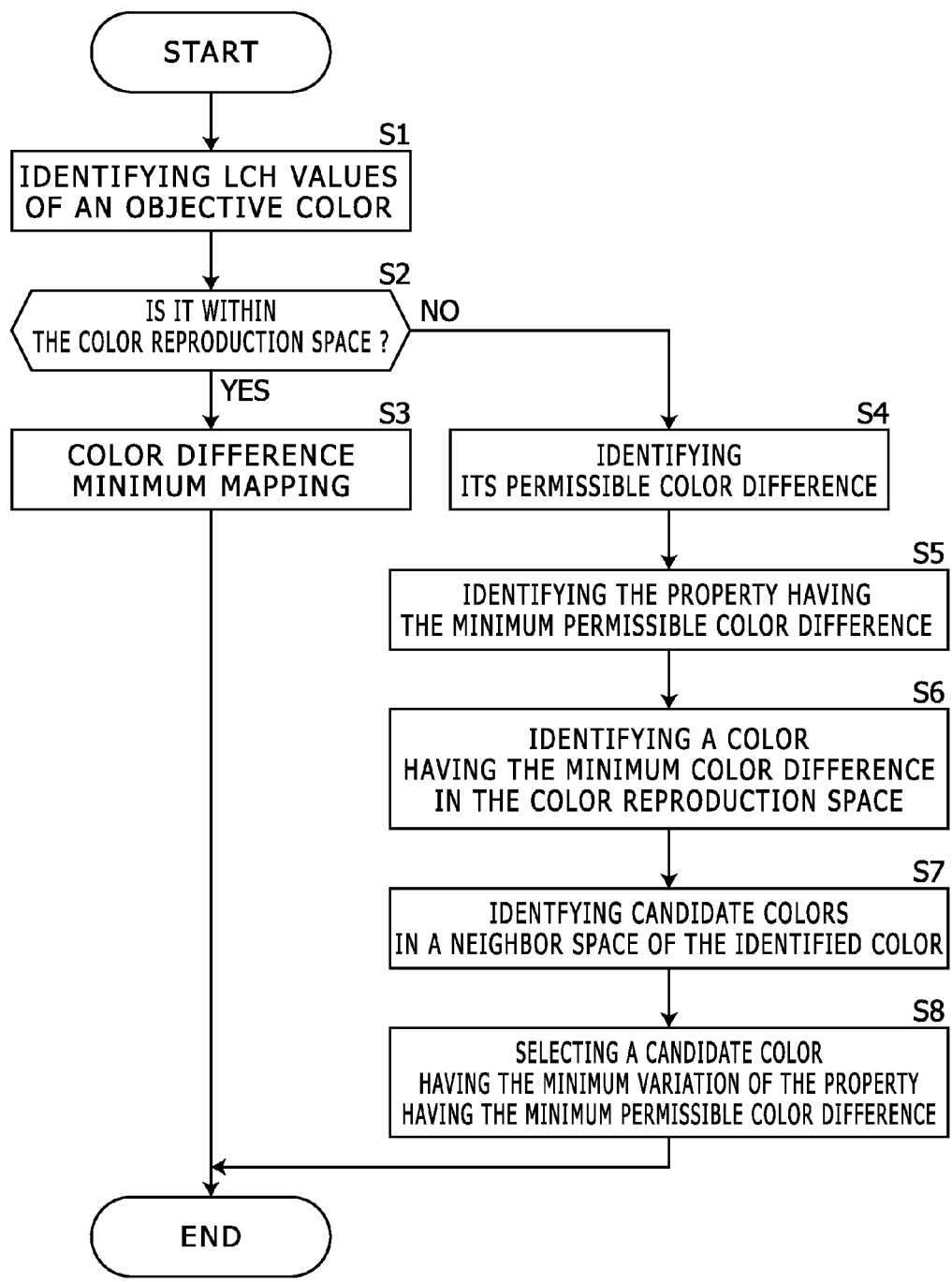
FIG. 5 shows a flowchart that explains color conversion in the image forming apparatus shown in FIG. 1.

In the following part, color conversion performed by the aforementioned image processing apparatus 13 is explained. FIG. 5 shows a flowchart that explains color conversion in the image forming apparatus shown in FIG. 1.

RGB values of the objective color and RGB values of the background color are obtained from image data supplied from the image scanning device 12. The background color identifying unit 22 identifies a value of brightness of the background color from the RGB values of the background color.

The color converting unit 23 identifies values of brightness L, chroma C, and hue angle H (hereinafter, referred as LCH values) from the RGB values of the objective color (Step S1).

Subsequently, the inside-outside identifying unit 31 identifies whether the objective color is a color within a color reproduction space of the printing device 11 in LCH coordinate system or not (Step S2).

If the objective color is a color within a color reproduction space of the printing device 11, a set of CMYK values is identified that minimizes a value of the color difference formula shown in FIG. 2, and the RGB values of the objective color is converted to this set of CMYK values (Step S3).

For example, the searching unit 32 identifies plural sets of CMYK values as sets of candidate values of which corresponding sets of LCH values are located in a neighbor space of LCH values obtained from the RGB values of the objective color in the LCH space, finds one of the sets of candidate values that minimizes a value of the color difference formula shown in FIG. 2 for (a) the LCH values of the RGB values of the objective color and (b) LCH values of this set of candidate values (CMYK values), and identifies the found set of candidate values as CMYK values that minimize a value of the color difference formula shown in FIG. 2.

On the other hand, if the objective color is not a color within a color reproduction space of the printing device 11, the searching unit 32 firstly identifies allowed color differences of respective properties (brightness, chroma, and hue angle) on the basis of the allowed color difference data 24 (Step S4), and identifies one of the properties that has the smallest allowed color difference among the identified allowed color differences (Step S5).

The searching unit 32 also identifies LCH values as base color values that minimize a value of the color difference formula shown in FIG. 2 among colors in the color reproduction space (Step S6).

Subsequently, the searching unit 32 finds plural sets of CMYK values of which corresponding sets of LCH values are located in a neighbor space of the base color values (Step S7), and selects one of the found sets of CMYK values that minimizes a variation from the base color values in the property identified in Step S5 (i.e. in the property of which the allowed color difference is smallest) and converts the RGB values of the objective color to the selected set of CMYK values (Step S8).

In the aforementioned manner, RGB values of each objective color in image data are mapped to CMYK values.

In the aforementioned embodiment, if the objective color is a color within the color reproduction space of the printing device 11, the searching unit 32 searches for CMYK values that minimize a value of the color difference formula for RGB values of an objective color and maps the RGB values to the CMYK values; and if the objective color is not a color within the color reproduction space of the printing device 11, the searching unit 32 searches for a set of color values as base color values in the color reproduction space that minimizes a value of the color difference formula for RGB values of an objective color, and converts the RGB values to CMYK values in a predetermine neighbor space of the base color values so that the CMYK values minimize a difference between property values (i.e. one is of the objective color, and the other is of the CMYK values) on a color property (any of L, C, and H) of which the allowed color difference is smallest among the allowed color differences at the RGB values of the objective color.

Therefore, color values of an objective color are converted to color values in a color space of an outputting device with relatively simple calculation in consideration of variance of subjective sensitivity to properties (brightness, chroma, and hue) of the objective color (i.e. sensitivity variance among properties to change of a property value).

Here an example is explained.

If an objective color in a red region is $L^*=51.4$, $a^*=71.6$, and $b^*=47.6$ (i.e. $L^*=51.4$, $C^*=86.0$, and $H^*=33.6$), this objective color is not within a color reproduction space of an ordinary electro photographic process.

When color conversion is performed for this objective color using the ordinary color difference formula shown in FIG. 4, the color to which the objective color is converted is $L^*=46.5$, $a^*=66.6$, and $b^*=47.4$. Therefore, in this case, variations of color properties are delta $L^*=4.9$, delta $C^*=4.2$, and delta $H^*=1.8$.

On the other hand, in this embodiment, if the brightness of the background color is identified as 94.5, when color conversion is performed for this objective color using the color difference formula shown in FIG. 2 in the aforementioned manner, the color to which the objective color is converted is $L^*=48.7$, $a^*=62.6$, and $b^*=44.0$. Therefore, in this case, variations of color properties are delta $L^*=2.7$, delta $C^*=9.5$, and delta $H^*=1.4$.

Meanwhile, allowed color differences of brightness, chroma, and hue angle of the objective color are identified as 5.1, 15, and 2.8 on the basis of the allowed color difference data 24 shown in FIGS. 3A to 3C. Therefore, the property having the smallest allowed color difference is hue angle. Further, change of brightness and chroma tends to be allowed in visual impression more than change of hue angle. Considering change of hue angle (i.e. delta $H^*$), as mentioned, change of hue angle when using the color difference formula shown in FIG. 2 is smaller than change of hue angle when using the ordinary color difference formula, and therefore tends to be allowed in visual impression.

The description has been presented for purposes of illustration and description, and is not intended to be exhaustive or limited.

For example, in the aforementioned embodiment, chroma and/or hue angle of the background color may be used as one or two parameters of the color difference formula shown in FIG. 2.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus converting first color values in a first color space to second color values in a second color space for an objective color, comprising:
   a color converting unit configured to calculate the second color values on the basis of the first color values using a color difference formula that evaluates a color difference between two sets of color values in a coordinate system of plural color properties that at least include brightness;
   a background color identifying unit configured to identify color values of a background color corresponding to the objective color; and
   a storage device configured to store allowed color difference data that indicates respective predetermined allowed color differences corresponding to property values of the plural color properties;
   wherein the second color space is a color space of a predetermined outputting device; and
   the color converting unit comprises:
      an inside-outside identifying unit configured to identify whether the objective color is a color within a color reproduction space of the outputting device or not, and
      a searching unit configured to find the second color values corresponding to the first color values of the objective color using the color difference formula;
      wherein the searching unit is further configured (a) to search for a set of color values in the second color space so that the set of color values minimizes a value of the color difference formula for the first color values and determine the set of color values as the second color values, if the objective color is a color within the color reproduction space of the outputting device; and to (b1) search for a set of color values as base color values in the color reproduction space so that the set of color values minimizes a value of the color difference formula for the first color values and (b2) as the second color values, determine a set of color values in a predetermine neighbor space of the base color values in the second color space so that the determined set of color values minimizes a difference between property values on a color property of which the allowed color difference is smallest among the allowed color differences at the first color values, if the objective color is not a color within the color reproduction space of the outputting device; wherein the color difference formula is a formula that, using the color value of the background color as a parameter, derives the color difference on the basis of a chroma difference, a brightness difference, and a hue angle difference between color values in the first color space and color values in the second color space wherein the color difference formula is a formula that derives the color difference using the product of the brightness difference and a coefficient based on a brightness value of the background color.

2. The image processing apparatus according to claim 1, wherein the neighbor space is a space in which a color difference of the color difference formula from the base color values is either equal to or smaller than a predetermined value.

3. The image processing apparatus according to claim 1, wherein:
   the first color space is RGB color space; and
   the second color space is CMYK color space.

4. An image forming apparatus, comprising:
   an image scanning device configured to scan a document image;
   an image processing apparatus configured to convert first color values in a first color space to second color values in a second color space for an objective color in the document image; and
   a printing device;
   wherein the image processing apparatus comprises:
      a color converting unit configured to calculate the second color values on the basis of the first color values using a color difference formula that evaluates a color difference between two sets of color values in a coordinate system of plural color properties that at least include brightness;
   a background color identifying unit configured to identify color values of a background color corresponding to the objective color; and
   a storage device configured to store allowed color difference data that indicates respective predetermined allowed color differences corresponding to property values of the plural color properties;
   wherein the second color space is a color space of the printing device; and
   the color converting unit comprises:
      an inside-outside identifying unit configured to identify whether the objective color is a color within a color reproduction space of the printing device or not, and
      a searching unit configured to find the second color values corresponding to the first color values of the objective color using the color difference formula;
      wherein the searching unit is further configured (a) to search for a set of color values in the second color space so that the set of color values minimizes a value of the color difference formula for the first color values and determine the set of color values as the second color values, if the objective color is a color within the color reproduction space of the printing device; and to (b1) search for a set of color values as base color values in the color reproduction space so that the set of color values minimizes a value of the color difference formula for the first color values and (b2) as the second color values, determine a set of color values in a predetermine neighbor space of the base color values in the second color space so that the determined set of color values minimizes a difference between property values on a color property of which the allowed color difference is smallest among the allowed color differences at the first color values, if the objective color is not a color within the color reproduction space of the printing device; wherein the color difference formula is a formula that, using the color value of the background color as a parameter, derives the color difference on the basis of a chroma difference, a brightness difference, and a hue angle difference between color values in the first color space and color values in the second color space wherein the color difference formula is a formula that derives the color difference using the product of the brightness difference and a coefficient based on a brightness value of the background color.

\* \* \* \* \*